(12) United States Patent
Tamaizumi et al.

(10) Patent No.: US 8,977,437 B2
(45) Date of Patent: Mar. 10, 2015

(54) ELECTRIC POWER STEERING SYSTEM

(71) Applicant: JTEKT Corporation, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/023,768

(22) Filed: Sep. 11, 2013

(65) Prior Publication Data

US 2014/0081524 A1    Mar. 20, 2014

(30) Foreign Application Priority Data

Sep. 18, 2012  (JP) ................................. 2012-204531

(51) Int. Cl.
*B62D 5/04* (2006.01)
*B62D 7/15* (2006.01)
*B62D 6/00* (2006.01)

(52) U.S. Cl.
CPC .............. *B62D 5/0463* (2013.01); *B62D 7/159* (2013.01); *B62D 5/0469* (2013.01); *B62D 6/002* (2013.01)
USPC ............... 701/42; 701/41; 180/443; 180/446; 280/771

(58) Field of Classification Search
None
See application file for complete search history.

(56) References Cited

U.S. PATENT DOCUMENTS

| 5,690,361 | A * | 11/1997 | Mouri ........................... 280/771 |
| 6,112,845 | A * | 9/2000 | Oyama et al. ................. 180/443 |
| 6,408,235 | B1 * | 6/2002 | Tanke et al. ...................... 701/41 |
| 6,999,862 | B2 * | 2/2006 | Tamaizumi et al. ............. 701/41 |
| 2007/0107977 | A1 * | 5/2007 | Shibata ......................... 180/444 |
| 2009/0112406 | A1 * | 4/2009 | Fujii et al. ....................... 701/42 |
| 2011/0010053 | A1 * | 1/2011 | Champagne ................... 701/42 |
| 2012/0199414 | A1 * | 8/2012 | Shimizu et al. ............... 180/446 |
| 2012/0232754 | A1 * | 9/2012 | Champagne et al. .......... 701/41 |

FOREIGN PATENT DOCUMENTS

JP    A-2006-175940    7/2006

* cited by examiner

*Primary Examiner* — John R Olszewski
*Assistant Examiner* — Jeffrey Boomer
(74) *Attorney, Agent, or Firm* — Oliff PLC

(57) ABSTRACT

A target pinion angle computation unit computes a target pinion angle on the basis of a basic assist component and a steering torque, and computes the target pinion angle so as to rapidly increase a steering reaction force when it is determined based on the target pinion angle that a rack shaft of a rack-and-pinion mechanism reaches a position near a limit of a movable range of the rack shaft. In an EPS, a correction component for the basic assist component, which is necessary to increase the steering reaction force rapidly, is computed through execution of PID control for causing an actual pinion angle to coincide with the target pinion angle. Because the correction component is added to the basic assist component, the steering reaction force is increased rapidly when the rack shaft reaches the position near the limit of the movable range.

2 Claims, 4 Drawing Sheets

ELECTRIC POWER STEERING SYSTEM

INCORPORATION BY REFERENCE/RELATED APPLICATION

This application claims priority to Japanese Patent Application No. 2012-204531 filed on Sep. 18, 2012 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

Conventionally, there has been known an electric power steering system (hereinafter referred to as an "EPS") that assists a driver's steering operation by applying power output from an electric motor to a steering mechanism of a vehicle. For example, a controller of an EPS described in Japanese Patent Application Publication No. 2006-175940 (JP 2006-175940 A) controls an electric motor based on steering torque, a steering angle, and a wheel steered angle obtained from various sensors.

The controller includes first and second reference models (models in which control purposes are formulated). The first reference model defines a relationship between a steering angle and target steering torque, and the second reference model defines a relationship between steering torque and a target steered angle. The controller executes proportional-integral-derivative (PID) control, which is a kind of feedback control, based on the target steering torque and the target steered angle defined by the first and second reference models.

The controller obtains a deviation of actual steering torque from the target steering torque defined by the first reference model, and a deviation of an actual steered angle from the target steered angle defined by the second reference model, and controls the electric motor so as to eliminate the deviations. Through the control, the controller causes the actual steering torque to follow the target steering torque, and causes the actual steered angle to follow the target steered angle.

In the EPS described in JP 2006-175940 A, a rack-and-pinion mechanism is employed as a steering mechanism. The mechanism changes the orientation of steered wheels by converting rotation of a pinion, which is generated in response to a steering operation, into a linear motion of a rack shaft that meshes with the pinion. The rack shaft is slidably housed in a housing. Usually, when the rack shaft reaches a limit of a movable range, so-called "end contact" occurs, that is, an end of the rack shaft (a rack end) contacts the housing, so that a range of movement of the rack shaft is restricted physically.

There may be a situation where steering torque is further applied through a driver's steering operation although the end of the rack shaft is in contact with the housing. This situation may occur, for example, when the vehicle is being parked in a garage. The foregoing second reference model defines the target steered angle that is an ideal steered angle corresponding to steering torque. Therefore, the target steered angle defined by the second reference model increases with an increase in steering torque, but the actual steered angle does not increase. In other words, even if the feedback control of a steered angle is executed, the deviation of the actual steered angle from the target steered angle is not eliminated and therefore the feedback control does not work. In such a case, the controller controls the electric motor so as to eliminate such a deviation, and applies excess assist torque in a steering direction.

When the above-described situation is changed to a situation where the actual steered angle is allowed to follow the target steered angle because, for example, a steering wheel is operated in a direction opposite to the direction in which the steering wheel has been operated, the assist torque is corrected such that the direction and magnitude of the assist torque become appropriate. However, a change in the assist torque during the course of correction may give a driver a sense of discomfort.

SUMMARY OF THE INVENTION

The invention provides an electric power steering system that is able to suppress deterioration of a steering feel by suppressing occurrence of a deviation of an actual steered angle from a target steered angle in feedback control of a steered angle, when so-called end contact occurs, that is, when a rack shaft reaches a limit of its movable range.

According to a feature of an example of the invention, there is provided an electric power steering system including a motor that is a source of generation of a steering assist force that is applied to a steering mechanism of a vehicle, and a control device that controls the motor in response to a vehicle steering operation, the steering mechanism including a rack-and-pinion mechanism, wherein: the control device includes a first computation unit that computes a base control component of the steering assist force to be applied to the steering mechanism on the basis of at least steering torque, and a second computation unit that computes a correction control component for the base control component through feedback control for causing an actual rotation angle of a rotary shaft that rotates in accordance with a steered angle of a steered wheel, to coincide with a target rotation angle computed on the basis of at least the steering torque; and the second computation unit computes the correction control component after restraining an increase in at least a magnitude of the steering torque used for computation of the target rotation angle so that the steering reaction force is increased rapidly when the target rotation angle reaches an angular threshold value that corresponds to a limit of a movable range that is set smaller than a physical movable range of a rack shaft of the rack-and-pinion mechanism.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
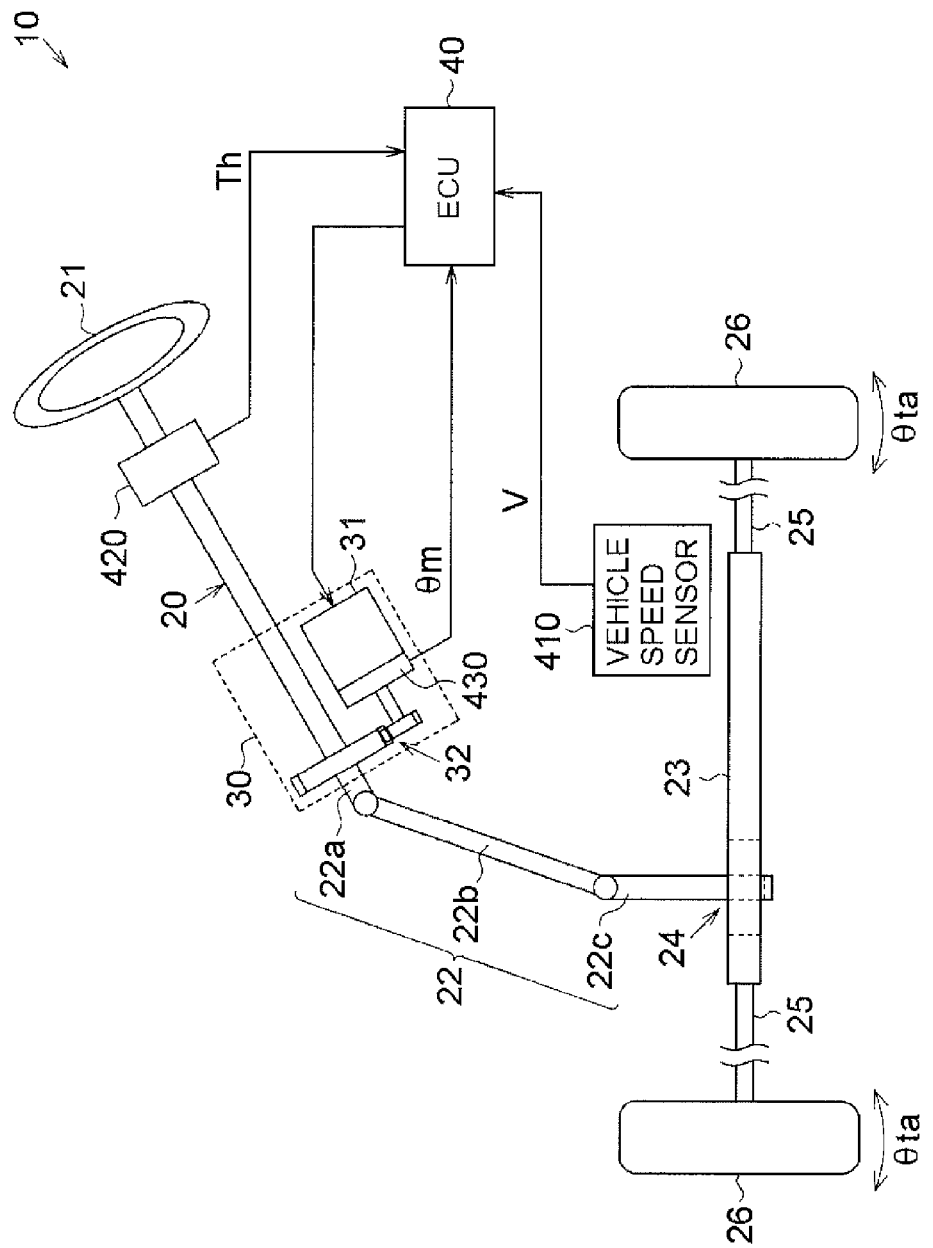
FIG. 1 is view showing the structure of an electric power steering system according to an embodiment of the invention.
Figure 2:
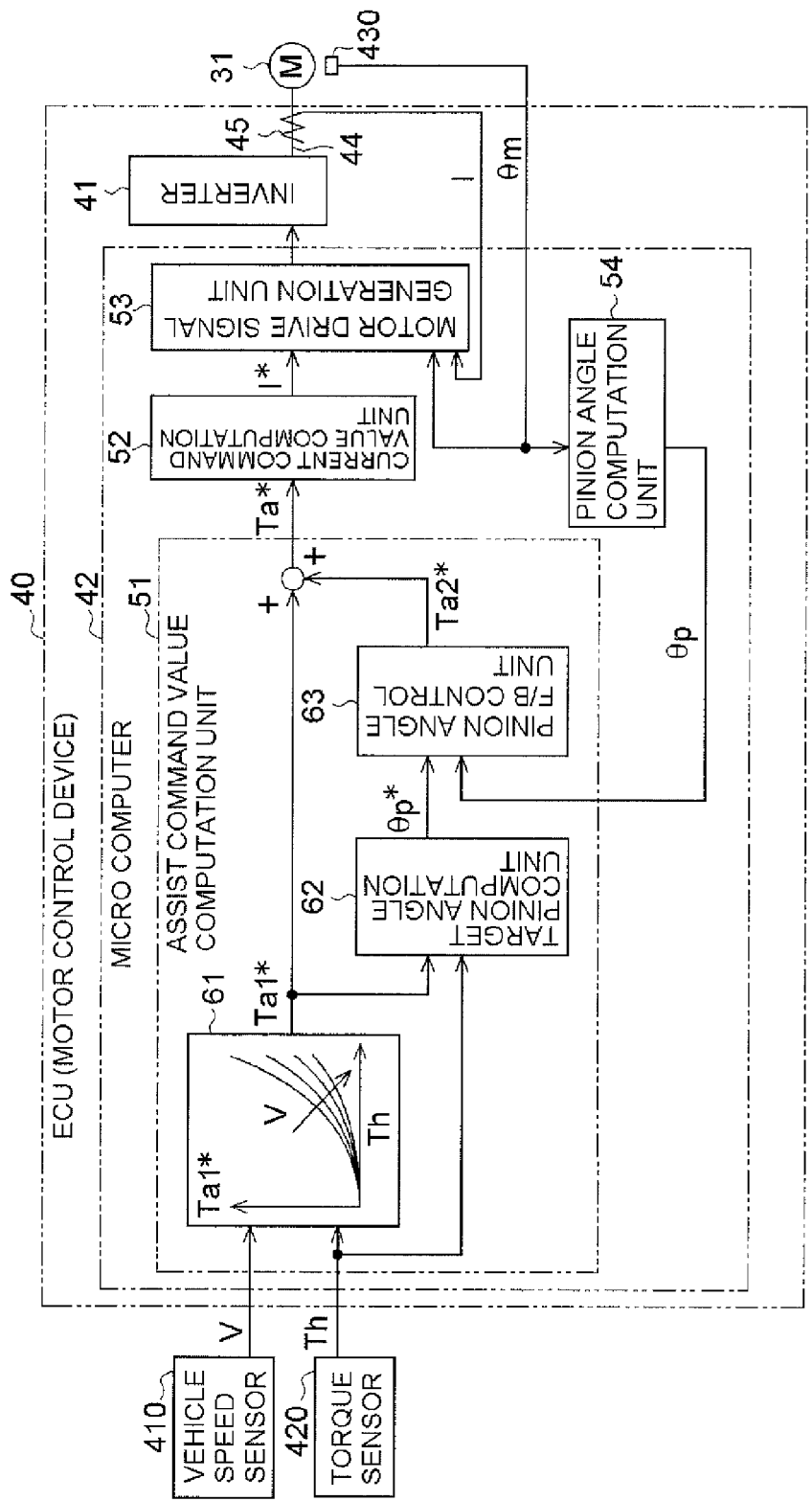
FIG. 2 is a control block diagram of a motor control device.

Hereinafter, an electric power steering system 10 according to an embodiment of the invention will be described with reference to FIG. 1 to FIG. 3. As shown in FIG. 1, the electric power steering system (EPS) 10 includes a steering mechanism 20 that steers steered wheels on the basis of a driver's steering operation, a steering assist mechanism 30 that assists the driver's steering operation, and an electronic control unit (ECU) 40 that controls operations of the steering assist mechanism 30.

The steering mechanism 20 includes a steering wheel 21 operated by a driver, and a steering shaft 22 that rotates together with the steering wheel 21. The steering shaft 22 includes a column shaft 22a, an intermediate shaft 22b, and a pinion shaft 22c. A lower end portion of the pinion shaft 22c is meshed with a rack shaft 23 extending in a direction that intersects with the pinion shaft 22c. Therefore, the rotary motion of the steering shaft 22 is converted into a linear reciprocating motion of the rack shaft 23 by a rack-and-pinion mechanism 24 formed of the pinion shaft 22c and the rack shaft 23. As the linear reciprocating motion is transmitted to right and left steered wheels 26, 26 through tie rods 25 that are connected to respective ends of the rack shaft 23, a steered angle θta of the steered wheels 26, 26 is changed. As the steered angle θta of the steered wheels 26, 26 is changed, the traveling direction of a vehicle is changed.

The steering assist mechanism 30 includes a motor 31 that is a source of generation of a steering assist force. A three-phase alternating current motor such as a brushless motor is employed as the motor 31. The motor 31 is connected to the column shaft 22a via a speed reduction mechanism 32. The speed reduction mechanism 32 reduces the speed of rotation of the motor 31, and transmits the rotation with a reduced speed to the column shaft 22a. In other words, as motor torque is applied to the steering shaft 22 as a steering assist force, the driver's steering operation is assisted.

The ECU 40 acquires results of detection obtained by various sensors provided in the vehicle as information that indicates a request from the driver or a traveling state, and controls the motor 31 on the basis of the various information acquired. The various sensors include, for example, a vehicle speed sensor 410, a torque sensor 420, and a rotation angle sensor 430. The vehicle speed sensor 410 detects a vehicle speed V. The torque sensor 420 is provided on the column shaft 22a, and detects a steering torque Th applied to the steering shaft 22 through the steering wheel 21. The rotation angle sensor 430 is provided at the motor 31, and detects a rotation angle θm of the motor 31. The ECU 40 controls the motor 31 based on the vehicle speed V, the steering torque Th, and the rotation angle θm acquired by these sensors.

The hardware configuration of the ECU 40 will be described below. As shown in FIG. 2, the ECU 40 includes an inverter circuit 41 and a microcomputer 42. The inverter circuit 41 converts direct current supplied from a direct current power source such as a battery, into three-phase alternating currents on the basis of a later-described motor drive signal generated by the microcomputer 42. The three-phase alternating currents obtained through conversion are supplied to the motor 31 through power feed paths 44 for respective phases. Current sensors 45 are provided in the power feed paths 44 for the respective phases. The current sensors 45 detect actual current values I generated in the power feed paths 44 for the respective phases. In FIG. 2, for convenience of explanation, the power feed paths 44 for the respective phases are collectively shown as one power feed path 44, and the current sensors 45 for the respective phases are collectively shown as one the current sensor 45.

The microcomputer 42 acquires detection results from the vehicle speed sensor 410, the torque sensor 420, the rotation angle sensor 430, and the current sensors 45 with respective predetermined sampling periods. The microcomputer 42 generates a motor drive signal (PWM drive signal) on the basis of the detection results that have been acquired, that is, the vehicle speed V, the steering torque Th, the rotation angle θm and the current value I.

Specifically, the microcomputer 42 executes vector control of motor current through PWM drive of the inverter circuit 41. In the vector control, a motor current is divided into a d-axis component (field current component) parallel to a magnetic field, and a q-axis component (torque current component) perpendicular to the d-axis component, and the currents obtained through division are independently subjected to target control. Due to the vector control, it is possible to use the motor 31 like a direct current motor.

Next, the functional structure of the microcomputer 42 will be described. The microcomputer 42 includes various computation-processing units that are realized by executing control programs stored in a storage unit (not shown). As shown in FIG. 2, the microcomputer 42 includes an assist command value computation unit 51, a current command value computation unit 52, a motor drive signal generation unit 53, and a pinion angle computation unit 54, which serve as the computation-processing units.

The assist command value computation unit 51 acquires the vehicle speed V, the steering torque Th, the rotation angle θm of the motor 31, and a later-described pinion angle θp computed by the pinion angle computation unit 54, and computes an assist command value Ta* on the basis of the various information acquired. The assist command value Ta* is a command value that indicates a torque (assist torque) that should be generated by the motor 31. The assist command value computation unit 51 will be described later in detail.

The current command value computation unit 52 computes a current command value I* on the basis of the assist command value Ta* computed by the assist command value computation unit 51. The current command value I* is a command value that indicates a current that should be supplied to the motor 31. Specifically, the current command value I* includes a q-axis current command value and a d-axis current command value in a d/q coordinate system. The d/q coordinate system is a rotating coordinate that changes in accordance with the rotation angle θm of the motor 31.

The motor drive signal generation unit 53 acquires the current command value I*, the actual current value I, and the rotation angle θm of the motor 31, and executes feedback control of current on the basis of the acquired information, so that the actual current value I follows the current command value I*. The motor drive signal generation unit 53 obtains a deviation between the current command value I* and the actual current value I, and generates a motor drive signal so as to eliminate the deviation.

The motor drive signal generation unit 53 converts three-phase current values of the motor 31 into two-phase vector components, that is, a d-axis current value and a q-axis current value in the d/q coordinate system, by using the rotation angle θm. The motor drive signal generation unit 53 obtains a deviation between the d-axis current value and the d-axis current command value, and a deviation between the q-axis current value and the q-axis current command value, and computes a PWM duty cycle for eliminating the deviations. The motor drive signal generated by the motor drive signal generation unit 53 contains the PWM duty cycle. As a current corresponding to the motor drive signal is supplied to the motor 31 through the inverter circuit 41, the motor 31 generates a torque corresponding to the assist command value Ta*.

The pinion angle computation unit 54 acquires the rotation angle θm of the motor 31, and computes the pinion angle θp, which is the rotation angle of the pinion shaft 22c, on the basis of the acquired rotation angle θm. As described above, the motor 31 is connected to the column shaft 22a via the speed reduction mechanism 32. Therefore, there is a correlation between the rotation angle θm of the motor 31 and the pinion angle θp. It is possible to obtain the pinion angle θp from the rotation angle Om of the motor 31 with the use of the correlation. Further, the pinion shaft 22c is meshed with the rack shaft 23. Therefore, there is a correlation between the pinion angle θp and an amount of movement of the rack shaft 23. Thus, the pinion angle θp is a value that reflects the steered angle θta of the steered wheels 26. The pinion angle θp is subjected to feedback control on the basis of a later-described target pinion angle θp*

Next, the assist command value computation unit 51 will be described in detail. As shown in FIG. 2, the assist command value computation unit 51 includes a basic assist component computation unit 61, a target pinion angle computation unit 62, and a pinion angle feedback control unit (pinion angle F/B control unit) 63.

The basic assist component computation unit 61 computes a basic assist component Ta1* on the basis of the vehicle speed V and the steering torque Th. The basic assist component Ta1* is a base control component of the assist command value Ta*. The basic assist component computation unit 61 computes the basic assist component Ta1* with the use of a three-dimensional map that defines a relationship between the steering torque Th and the basic assist component Ta1* according to the vehicle speed V. As the absolute value of the steering torque Th increases, and as the vehicle speed V is reduced, the basic assist component computation unit 61 sets the absolute value of the basic assist component Ta1* to a larger value.

The target pinion angle computation unit 62 acquires the basic assist component Ta1* generated by the basic assist component computation unit 61, and the steering torque Th. The target pinion angle computation unit 62 has an ideal model that defines an ideal pinion angle on the basis of basic drive torque (input torque), when the sum of the basic assist component Ta1* and the steering torque Th is used as the basic drive torque. The ideal model is obtained, in advance through, for example, experiments, by modeling a pinion angle that corresponds to an ideal steering angle according to the basic drive torque. The target pinion angle computation unit 62 adds the basic assist component Ta1* to the steering torque Th to obtain the basic drive torque, and computes the target pinion angle θp* from the obtained basic drive torque, on the basis of the ideal model. The target pinion angle computation unit 62 will be described later in detail.

The pinion angle feedback control unit 63 acquires the target pinion angle θp* computed by the target pinion angle computation unit 62, and the actual pinion angle θp computed by the pinion angle computation unit 54. The pinion angle feedback control unit 63 executes proportional-integral-derivative (PID) control as feedback control of the pinion angle, so that the actual pinion angle θp follows the target pinion angle θp*. That is, the pinion angle feedback control unit 63 obtains a deviation between the target pinion angle θp* and the actual pinion angle θp, and obtains a correction component Ta2* (a correction control component) for the basic assist component Ta1* so as to eliminate the deviation. The assist command value computation unit 51 computes the assist command value Ta* by adding the correction component Ta2* to the basic assist component Ta1*.

Next, the target pinion angle computation unit 62 will be described in detail. As described earlier, the target pinion angle computation unit 62 computes the target pinion angle θp*, on the basis of the ideal model, from the basic drive torque that is the sum of the basic assist component Ta1* and the steering torque Th. The ideal model is a model obtained by utilizing the fact that the torque applied to the steering shaft 22, in other words, the above-described basic drive torque Tp*, is expressed by Equation (A) indicated below.

$$Tp^* = J\theta p^{*\prime\prime} + C\theta p^{*\prime} + K\theta p^* \qquad \text{Equation (A)}$$

Note that, in Equation (A), J is a moment of inertia of the steering wheel 21 and the steering shaft 22, C is a viscosity coefficient (friction coefficient) that corresponds to, for example, friction of the rack shaft 23 against the housing, and K is a spring coefficient when the steering wheel 21 and the steering shaft 22 are regarded as springs.

As can be seen from Equation (A), the basic drive torque Tp* is obtained by adding a value obtained by multiplying a second-order time differential value θp*″ of the target pinion angle θp* by the moment of inertia J, a value obtained by multiplying a first-order time differential value θp*′ of the target pinion angle θp* by the viscosity coefficient C, and a value obtained by multiplying the target pinion angle θp* by the spring coefficient K.

The target pinion angle computation unit 62 computes the target pinion angle θp* according to the ideal model based on Equation (A). As shown in FIG. 3, the ideal model based on Equation (A) is divided into an ideal EPS model 71 and an ideal vehicle model 72.

The ideal EPS model 71 is tuned according to characteristics of the components of the electric power steering system 10 such as the steering shaft 22 and the motor 31. The ideal EPS model 71 includes an adder 73, a subtractor 74, an inertia model 75, a first integrator 76, a second integrator 77, and a viscosity model 78.

The adder 73 computes the basic drive torque Tp* by adding the basic assist component Ta1* and the steering torque Th. The subtractor 74 subtracts a later-described viscosity component Tvi* and a spring component Tsp* from the basic drive torque Tp* computed by the adder 73. Here, a value obtained by subtracting the viscosity component Tvi* and the spring component Tsp* from the basic drive torque Tp* is defined as a subtracted value Tp**.

The inertia model 75 functions as an inertia control computation unit that corresponds to an inertia term in Equation (A). The inertia model 75 computes a pinion angular acceleration αp* by multiplying the subtracted value Tp**, which is computed by the subtractor 74, by an inverse of the moment of inertia JP.

The first integrator 76 computes a pinion angular velocity ωp* by integrating the pinion angular acceleration αp* computed by the inertia model 75. The second integrator 77 computes the target pinion angle θp* by further integrating the pinion angular velocity ωp* computed by the first integrator 76. The target pinion angle θp* is an ideal rotation angle of the pinion shaft 22c based on the ideal EPS model 71.

The viscosity model 78 functions as a viscosity control computation unit that corresponds to a viscosity term in Equation (A). The viscosity model 78 computes the viscosity component Tvi* of the basic drive torque Tp* by multiplying the pinion angular velocity ωp*, which is computed by the first integrator 76, by the viscosity coefficient C.

The ideal vehicle model 72 is tuned according to characteristics of the vehicle in which the electric power steering system 10 is installed. Vehicle-side characteristics that exert influence on the steering characteristics include, for example, specifications of a suspension and wheel alignment, and a gripping force (force of friction) of the steered wheels 26, 26. The ideal vehicle model 72 functions as a spring characteristic control computation unit that corresponds to a spring term in Equation (A). The ideal vehicle model 72 computes the spring component Tsp* of the basic drive torque Tp* by multiplying the target pinion angle θp*, which is computed by the second integrator 77, by the spring coefficient K.

With the target pinion angle computation unit 62 configured as described above, the relationship between the basic drive torque Tp* and the target pinion angle θp* is directly tuned by adjusting the moment of inertia J and the viscosity coefficient C of the ideal EPS model 71, and the spring coefficient K of the ideal vehicle model 72. This makes it possible to realize desired steering characteristics.

In the present embodiment, the target pinion angle θp* is derived from the basic drive torque Tp* on the basis of the ideal EPS model 71 and the ideal vehicle model 72, and feedback control is executed so that the actual pinion angle θp coincides with the target pinion angle θp*. As described earlier, there is a correlation between the pinion angle θp and the steered angle θta of the steered wheels 26, 26. Therefore, a steered operation of the steered wheels 26, 26 based on the basic drive torque Tp* is also defined by the ideal EPS model 71 and the ideal vehicle model 72. That is, the vehicle steering feel is determined by the ideal EPS model 71 and the ideal vehicle model 72. Thus, the desired steering feel is realized by adjusting the ideal EPS model 71 and the ideal vehicle model 72.

The actual steered angle θta is maintained at the steered angle Ota corresponding to the target pinion angle θp*. Therefore, an effect of restraining reverse input vibration, which is generated due to road conditions or disturbance such as braking, is obtained. This means that the correction component Ta2* is adjusted so that the pinion angle θp is brought to the target pinion angle θp* even in a case where vibration is transmitted to the steering mechanism 20 via the steered wheels 26, 26. Therefore, the actual steered angle θta is maintained at the steered angle θta corresponding to the target pinion angle θp* defined by the ideal model. As a result, because steering assist is performed in such a direction that the reverse input vibration is cancelled, transmission of the reverse input vibration to the steering wheel 21 is restrained.

As described earlier, the pinion angle feedback control unit 63 executes the PID control of the pinion angle θp so that the actual pinion angle θp follows the target pinion angle θp*. Therefore, when an end portion of the rack shaft 23 comes into contact with the housing through a driver's steering operation, the deviation between the target pinion angle θp*, which is computed by the target pinion angle computation unit 62, and the actual pinion angle θp is accumulated temporally by an integral action of the PID control. Thus, even if the deviation is eliminated because, for example, the steering wheel 21 is operated in a direction opposite to the direction in which the steering wheel 21 has been operated, the pinion angle feedback control unit 63 generates the correction component Ta2* corresponding to an accumulated value of the preceding deviations. The steering assist based on the assist command value Ta*, to which the correction component Ta2* is added, is not a steering assist corresponding to the steering operation at this time. Therefore, the driver may feel a sense of discomfort during a steering operation.

Thus, in the present embodiment, a movable range of the rack shaft 23 is virtually generated through the control of the motor 31, which is executed by the microcomputer 42. The microcomputer 42 generates a virtual movable range before the rack shaft 23 reaches a limit of an actual movable range that mechanically restricts the movement of the rack shaft 23. By giving the driver a sense of virtual end contact before the rack shaft 23 reaches the limit of the actual movable range, in other words, before the rack end comes into contact with the housing, it is possible to restrain the operation of the steering wheel 21 from being continued until the rack end actually comes into contact with the housing. Hereafter, means for generating the virtual movable range of the rack shaft 23 will be described in detail.

Figure 3:
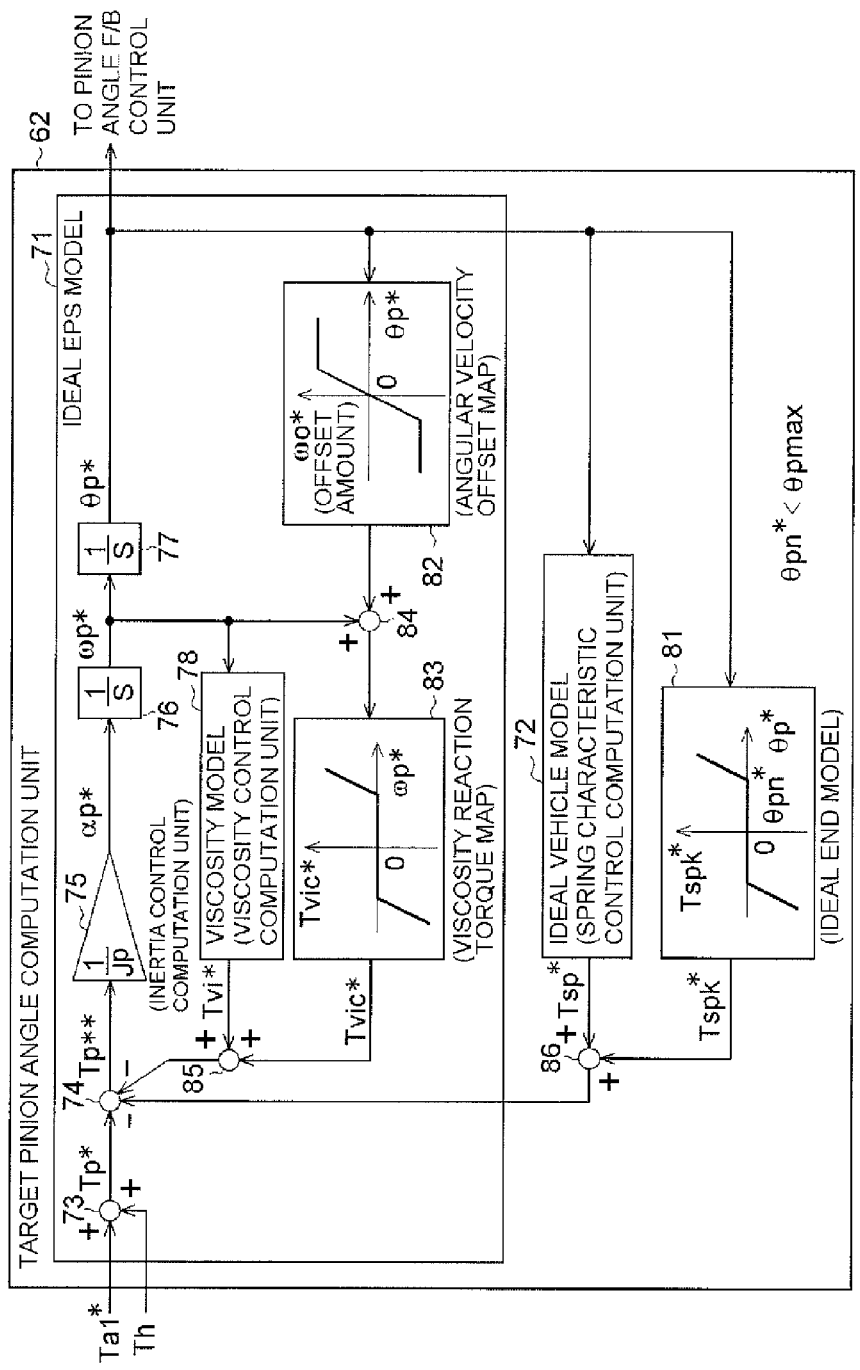
FIG. 3 is a control block diagram of a target pinion angle computation unit.

As shown in FIG. 3, the target pinion angle computation unit 62 includes an ideal end model 81. The ideal end model 81 is obtained, through experiments, by modeling an ideal spring reaction torque Tspk* corresponding to the target pinion angle θp* computed by the second integrator 77, in order to generate the virtual movable range. The spring reaction torque Tspk* is a correction component for the target pinion angle θp* corresponding to the basic drive torque Tp*, and is also a correction component for the spring component Tsp* of the basic drive torque Tp*.

The ideal end model 81 computes the spring reaction torque Tspk* (assist elastic component) corresponding to the present target pinion angle θp*. Characteristics of the ideal end model 81 when, for example, the target pinion angle θp* increases in a positive direction with respect to zero are as follows. The ideal end model 81 does not generate the spring reaction torque Tspk* until the target pinion angle θp* reaches a vicinity value θpn* (angular threshold value), which is a value close to a maximum value θpmax of the pinion angle θp (the limit of the movable range). The ideal end model 81 generates the spring reaction torque Tspk* after the target pinion angle θp* reaches the vicinity value θpn*, and increases the value of the spring reaction torque Tspk* rapidly in the positive direction. After the target pinion angle θp* reaches the vicinity value θpn* and before the target pinion angle θp* reaches the maximum value θpmax, the spring reaction torque Tspk* is set to a value as described below. The spring reaction torque Tspk*, in addition to the viscosity component Tvi* and the spring component Tsp* described above, is subtracted from the basic drive torque Tp*. Thus, the spring reaction torque Tspk* is set so that the magnitude of the subtracted value Tp**, which is used as the base for computation of the target pinion angle θp*, does not increase after the target pinion angle θp* reaches the vicinity value θpn*. This also applies to the case where the target pinion angle θp* increases in a negative direction with respect to zero.

As described earlier, there is a correlation between the pinion angle θp and an amount of movement of the rack shaft 23. Therefore, the position of the rack shaft 23 may be converted into and expressed as the pinion angle θp.

With the ideal end model 81 configured as described above, when, for example, the positive basic drive torque Tp* acts and the target pinion angle θp* reaches the positive vicinity value θpn*, the positive spring reaction torque Tspk* is increased rapidly. The spring reaction torque Tspk* computed by the ideal end model 81 is added, by an adder 86, to the spring component Tsp* computed by the ideal vehicle model 72. Hence, in the subtractor 74, a value of the spring component Tsp*, which is increased by an amount of the spring reaction torque Tspk*, is subtracted from the basic drive torque Tp*. That is, the subtracted value Tp** computed by the subtractor 74 is decreased by the amount of the spring reaction torque Tspk*.

The magnitude of the spring reaction torque Tspk* increases as the target pinion angle θp* increases at the rate that is specified by the ideal end model 81. Because the magnitude of the spring reaction torque Tspk* increases, the subtracted value Tp** is prevented from increasing, and consequently the value of the target pinion angle θp* based on the subtracted value Tp** is prevented from increasing. As a result, the target pinion angle θp*, which is computed based on the subtracted value Tp** through the use of the inertia model 75, the first integrator 76, and the second integrator 77, is prevented from being larger than the maximum value θpmax of the actual pinion angle θp. Thus, in the electric power steering system 10 according to the present embodiment, the pinion angle θp does not reach the maximum value θpmax, and the vicinity value θpn* is a substantive limit of the movable range. The electric power steering system 10 according to the present embodiment is able to cause the pinion angle θp to follow the target pinion angle θp* by the feedback control of the pinion angle even at the limit of the virtual movable range that is generated as described above. Therefore, no deviation is generated between the target pinion angle θp* and the actual pinion angle θp. Therefore, a driver is able to perform a steering operation without feeling a sense of discomfort.

An increase in the spring reaction torque Tspk* in the ideal end model 81 is transmitted to the driver via the steering wheel 21 as a steering reaction force. Hence, the driver feels a sense of end contact at the limit of the virtual movable range due to an ideal steering reaction force based on the ideal end model 81. This also applies to the case where the negative basic drive torque Tp* acts and the target pinion angle θp* reaches the negative vicinity value θpn*.

As described above, the steering range of the steering wheel 21 is limited to a virtual range that is smaller than the original maximum steering range. Therefore, it is possible to restrain the steering operation from being continued until the rack shaft 23 actually comes into contact with the housing, thereby preventing an excess impact from acting on the rack shaft 23 and the housing.

However, there is a concern that the following problem is more likely to occur if the rate of increase in the spring reaction torque Tspk* in the ideal end model 81 is set to a higher value. In a case where the rack shaft 23 reaches the limit of the virtual movable range, when the steering reaction force is increased too rapidly in accordance with the ideal end model 81, the steering reaction force may be transmitted to the driver as an impact via the steering wheel 21. Therefore, in the present embodiment, the following configuration is employed in order to alleviate an impact when the rack shaft 23 reaches the limit of the virtual movable range.

As shown in FIG. 3, the target pinion angle computation unit 62, more specifically, the ideal EPS model 71 is provided with an angular velocity offset map 82 and a viscosity reaction torque map 83.

The angular velocity offset map 82 defines a relationship between the target pinion angle θp* and an offset amount ωo*. The angular velocity offset map 82 is used to compute an offset amount with respect to the pinion angular velocity ωp* (the pinion angular velocity ωp* computed by the first integrator 76) according to the target pinion angle θpt. As the target pinion angle θp* approaches the vicinity value θpn* that corresponds to the limit of the virtual movable range, the angular velocity offset map 82 sets the offset amount of the pinion angular velocity ωp* to a larger value. After the target pinion angle θp* reaches the vicinity value θpn*, the angular velocity offset map 82 maintains the offset amount at a constant value. The offset amount computed by the angular velocity offset map 82 is added, by an adder 84, to the pinion angular velocity ωp* computed by the first integrator 76.

Hereinafter, the pinion angular velocity ωp* to which the offset amount is added will be referred to as "pinion angular velocity ωp* after offset".

The viscosity reaction torque map 83 defines a relationship between the pinion angular velocity ωp* and the viscosity reaction torque Tvic*. The viscosity reaction torque map 83 computes the viscosity reaction torque Tvic* (assist viscosity component) on the basis of the pinion angular velocity ωp* after offset. The viscosity reaction torque map 83 increases the magnitude of the viscosity reaction torque Tvic* rapidly when the pinion angular velocity ωp* becomes a predetermined value or higher. The viscosity reaction torque Tvic* computed by the viscosity reaction torque map 83 is added, by an adder 85, to the viscosity component Tvi* computed by the viscosity model 78.

Because the angular velocity offset map 82 and the viscosity reaction torque map 83 are provided in the target pinion angle computation unit 62 (more specifically, the ideal EPS model 71), as the target pinion angle θp* approaches the vicinity value θpn* that corresponds to the limit of the virtual movable range, the offset amount ωo* with respect to the pinion angular velocity ωp* increases. Therefore, the viscosity reaction torque Tvic* is likely to be set to a larger value. The viscosity reaction torque Tvic* is added to the viscosity component Tvi* computed by the viscosity model 78, and the viscosity component Tvi* to which the viscosity reaction torque Tvic* is added is subtracted from the basic drive torque Tp*. Therefore, viscosity resistance acts in a direction opposite to the direction of the actual pinion angular velocity, on the basis of the pinion angular velocity ωp* after offset. That is, even if the rack shaft 23 abruptly reaches the limit of the virtual movable range, the viscosity reaction torque Tvic* is added to the viscosity component Tvi* when the pinion angular velocity ωp* becomes the predetermined value or higher, and viscosity resistance of the steering mechanism 20 is made higher than that in normal times. Therefore, it is possible to restrain an impact that the driver may feel when the rack shaft 23 reaches the limit of the virtual movable range.

According to the present embodiment, the following advantageous effects are obtained.

(1) When the rack shaft 23 reaches a position near the limit of the movable range (the limit of the virtual movable range), the steering reaction force transmitted to the driver via the steering wheel 21 is increased rapidly through correction of the basic assist component Ta1* by the correction component Ta2*. The correction component Ta2* at this time restrains an increase in the magnitude of the basic drive torque Tp* (the sum of the basic assist component Ta1* and the steering torque Th) that is used for computation of the target pinion angle θp*, and the correction component Ta2* is obtained through the feedback control for causing the actual pinion angle θp to follow the target pinion angle θp*, which is computed on the basis of the restrained basic drive torque Tp*. The value of the target pinion angle θp* computed by the target pinion angle computation unit 62 is reduced by an amount by which the magnitude of the basic drive torque Tp* is restrained. Thus, it is possible to prevent the value of the target pinion angle θp* computed by the target pinion angle computation unit 62 from being larger than the vicinity value θpn*, which is a value close to the maximum value θpmax of the pinion angle θp, when the rack shaft 23 reaches the limit of the virtual movable range that has been set. As a result, even if the rack shaft 23 reaches the limit of the virtual movable range that has been set, no deviation is generated between the actual pinion angle θp and the target pinion angle θp* in the feedback control of the pinion angle θp, in other words, between the actual steered angle θta and the target steered angle in the feedback control of the steered angle $\theta$ta. Thus, the steering feel is not deteriorated.

The steering reaction force is a force that acts in a direction opposite to the direction of the steering torque Th. Therefore, by increasing the steering reaction force through control by the microcomputer 42, it is possible to create the virtual movable range of the rack shaft 23. Thus, the steering range is limited to the virtual range that is smaller than the original maximum steering range. Hence, it is possible to restrain the steering operation from being continued until the rack shaft 23 reaches the limit of the actual physical movable range. Because the rack shaft 23 does not reach the limit of the physical movable range, end contact does not occur in the electric power steering system 10 according to the present embodiment, unlike in the related art. Therefore, unlike in the related art, an excess impact at the time of the end contact does not act on the steering mechanism 20.

(2) The ideal end model 81 of the target pinion angle computation unit 62 computes the spring reaction torque Tspk* so as to rapidly increase the elastic component (spring component) of the steering reaction force when the target pinion angle $\theta$p* reaches the vicinity value $\theta$pn*. The target pinion angle computation unit 62 computes the target pinion angle $\theta$p* on the basis of the basic drive torque Tp* (subtracted value Tp**), the magnitude of which is restrained by an amount of the spring reaction torque Tspk*. The pinion angle feedback control unit 63 computes the correction component Ta2* through the feedback control for causing the actual pinion angle $\theta$p to follow the target pinion angle $\theta$p*, which is computed by the target pinion angle computation unit 62. The elastic component contained in the steering reaction force is increased rapidly through the correction of the basic assist component Ta1* by the correction component Ta2*. As described above, by rapidly increasing the elastic component contained in the steering reaction force through the correction of the basic assist component Ta1* by the correction component Ta2*, a driver is given a sense of virtual end contact.

(3) When the pinion angular velocity $\omega$p* becomes the predetermined value or higher, the viscosity reaction torque map 83 of the target pinion angle computation unit 62 computes the viscosity reaction torque Tvic* so as to increase the viscosity component contained in the steering reaction force. The target pinion angle computation unit 62 computes the target pinion angle $\theta$p* on the basis of the basic drive torque Tp* (subtracted value Tp**), the magnitude of which is restrained by an amount of the viscosity reaction torque Tvic*. The pinion angle feedback control unit 63 computes the correction component Ta2* through the feedback control for causing the actual pinion angle $\theta$p to follow the target pinion angle $\theta$p*, which is computed by the target pinion angle computation unit 62. The viscosity component contained in the steering reaction force is increased rapidly through the correction of the basic assist component Ta1* by the correction component Ta2*. When the steering reaction force is increased rapidly, the steering reaction force may be transmitted to the driver as an impact via the steering mechanism 20. However, according to the present embodiment, even when the rack shaft 23 abruptly reaches the limit of the virtual movable range, the viscosity component in the steering reaction force is increased, and an impact due to the steering reaction force is thus alleviated by viscosity resistance.

(4) As the target pinion angle $\theta$p* approaches the vicinity value $\theta$pn*, the target pinion angle computation unit 62 corrects the pinion angular velocity $\omega$p*, which is used for computation of the viscosity reaction torque Tvic*, to a larger value. More specifically, as the target pinion angle $\theta$p* approaches the vicinity value $\theta$pn*, the angular velocity offset map 82 sets the offset amount $\omega$o* of the pinion angular velocity $\omega$p* to a larger value. The offset amount $\omega$o* is added, by the adder 84, to the pinion angular velocity $\omega$p* that is computed by the first integrator 76. The viscosity reaction torque map 83 computes the viscosity reaction torque Tvic* with the use of the pinion angular velocity $\omega$p* after offset. With this configuration, as the target pinion angle $\theta$p* approaches the vicinity value $\theta$pn*, the magnitude of the pinion angular velocity $\omega$p*, which is used for computation of the viscosity reaction torque Tvic*, is corrected to a larger value. Thus, computation of the viscosity reaction torque Tvic* is facilitated. Therefore, it is possible to effectively alleviate an impact when the rack shaft 23 reaches the limit of the virtual movable range.

(5) The steering reaction force is increased in accordance with the ideal end model 81 that is obtained by modeling the spring reaction torque Tspk*, which is the steering reaction force component corresponding to the target pinion angle $\theta$p*. It is possible to flexibly form the virtual movable range of the rack shaft 23 by appropriately tuning the ideal end model 81.

(6) The pinion shaft 22c is employed as a rotary shaft that rotates in proportion to the steered angle $\theta$ta of the steered wheels 26, 26. It is possible to control the steered angle Ota indirectly through the PID control of the pinion angle $\theta$p. In other words, the feedback control of the pinion angle $\theta$p may also be regarded as the feedback control of the steered angle $\theta$ta.

The foregoing embodiment may be modified as described below.

Figure 4:
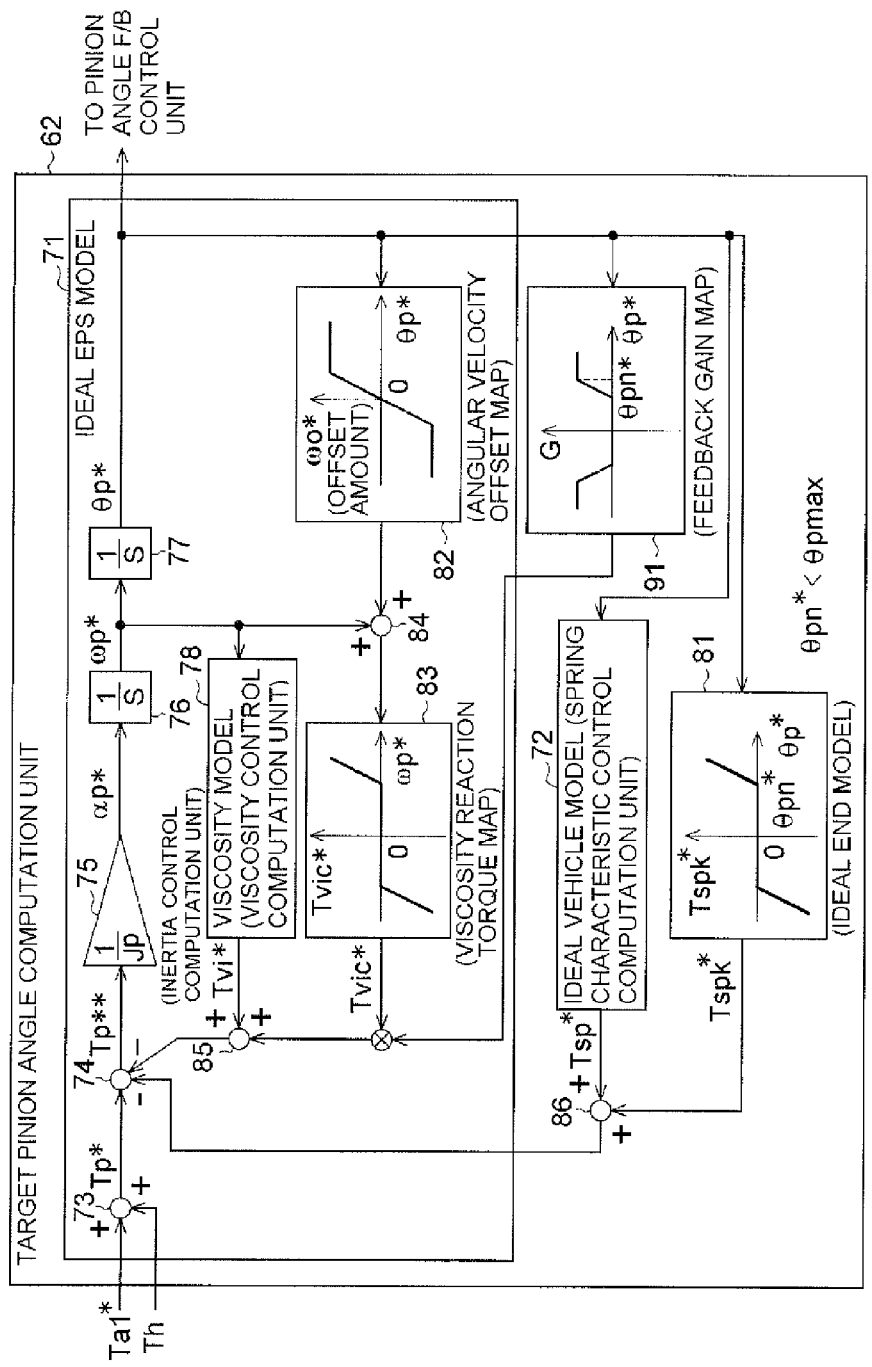
FIG. 4 is a control block diagram of a target pinion angle computation unit according to another embodiment of the invention.

The viscosity reaction torque Tvic* computed by the viscosity reaction torque map 83 may be multiplied by a feedback gain. As shown in FIG. 4, a feedback gain map 91 is provided in the target pinion angle computation unit 62. The feedback gain map 91 defines a relationship between the target pinion angle $\theta$p* and the feedback gain (an angle gain) G. The feedback gain map 91 increases the value of the feedback gain G rapidly with respect to the target pinion angle $\theta$p* when the target pinion angle $\theta$p* becomes close to the vicinity value $\theta$pn*. The feedback gain map 91 maintains the feedback gain G at a constant value after the target pinion angle $\theta$p* reaches the vicinity value $\theta$pn*. As described above, the target pinion angle computation unit 62 increases the viscosity reaction torque Tvic* when the target pinion angle $\theta$p* becomes a predetermined value or larger, in other words, when the rack shaft 23 comes close to the limit of the virtual movable range. With this configuration, the viscosity component of the steering reaction force is further increased when the target pinion angle $\theta$p* reaches the vicinity value $\theta$pn*. Thus, an impact that occurs when the rack shaft 23 reaches the limit of the virtual movable range may be alleviated more effectively.

Although the feedback control is executed on the pinion angle $\theta$p that corresponds to the steered angle $\theta$ta of the steered wheels 26, 26, feedback control may be executed on a rotation angle of the intermediate shaft 22b. Feedback control may be executed on a rotation angle of an output shaft of the motor 31. Both the rotation angle of the intermediate shaft 22b and the rotation angle of the output shaft of the motor 31 are values that reflect the steered angle $\theta$ta. Therefore, feedback control of the steered angle $\theta$ta is indirectly executed through the feedback control of these rotation angles. Alternatively, the steered angle $\theta$ta of the steered wheels 26, 26 may be detected and feedback control may be directly executed on the steered angle $\theta$ta. In this case, the target pinion angle computation unit 62 functions as a target steered angle computation unit, and the pinion angle feedback control unit 63 functions as a steered angle feedback control unit. In this way as well, no deviation is generated between the actual steered angle and the target steered angle in the feedback control of the steered angle θta, when the rack shaft 23 reaches the limit of the virtual movable range, and therefore the steering feel is not deteriorated.

The ideal end model 81 has been described as a separate model in the same hierarchy as the ideal EPS model 71 and the ideal vehicle model 72, but the ideal end model 81 may be included in the ideal vehicle model 72.

The ideal EPS model 71 obtains the target pinion angle θp* (ideal pinion angle) on the basis of the sum of the basic assist component Ta1* and the steering torque Th. However, the target pinion angle θp* may be obtained on the basis of only the steering torque Th.

The torque sensor 420 is provided on the column shaft 22a, but may be provided on the intermediate shaft 22b or the pinion shaft 22c. The torque sensor 420 may be provided at any appropriate location in the steering mechanism 20 as long as the torque sensor 420 is able to detect the steering torque Th.

The basic assist component computation unit 61 obtains the basic assist component Ta1* on the basis of the steering torque Th and the vehicle speed V. However, the basic assist component Ta1* may be obtained on the basis of only the steering torque Th. Further, the basic assist component computation unit 61 may execute at least one of phase compensation control and torque derivative control. The phase compensation control may change the phase of the steering torque Th, which is detected by the torque sensor 420, on the basis of an assist gradient. It is desirable that torque derivative control increases the value of the basic assist component Ta1* as a differential value of the basic assist component Ta1* becomes larger.

The ideal end model 81 is included in the target pinion angle computation unit 62. However the ideal end model 81 may be provided separately as a function of the microcomputer 42.

The PID control is executed on the pinion angle θp in the pinion angle feedback control unit 63. However, PI control may be executed.

The invention is applied to the electric power steering system 10 that applies a steering assist force to the column shaft 22a. However, the invention may be applied to an electric power steering system that applies a steering assist force to, for example, the pinion shaft 22c or the rack shaft 23.

What is claimed is:

1. An electric power steering system including a motor that is a source of generation of a steering assist force that is applied to a steering mechanism of a vehicle, and a control device that controls the motor in response to a vehicle steering operation, the steering mechanism including a rack-and-pinion mechanism, wherein:

the control device includes a first computation unit that computes a base control component of the steering assist force to be applied to the steering mechanism on the basis of at least steering torque, and a second computation unit that computes a correction control component for the base control component through feedback control such that an actual rotation angle of a rotary shaft that rotates in accordance with a steered angle of a steered wheel coincides with a target rotation angle computed on the basis of at least the steering torque, the second computation unit computes the correction control component after restraining an increase in at least a magnitude of the steering torque forming a basis for computation of the target rotation angle so that a steering reaction force is increased rapidly when the target rotation angle reaches an angular threshold value that corresponds to a limit of a movable range that is set smaller than a physical movable range of a rack shaft of the rack-and-pinion mechanism, the second computation unit computes an assist viscosity component so as to increase a viscosity component contained in the steering reaction force when an angular velocity of the rotary shaft becomes a predetermined magnitude or larger, and the second computation unit corrects the magnitude of the angular velocity forming a basis for computation of the assist viscosity component to a modified angular velocity value that is larger than the angular velocity so as to increase the assist viscosity component in response to the target rotation angle approaching the angular threshold value.

2. The electric power steering system according to claim 1, wherein the second computation unit computes an assist elastic component so as to rapidly increase an elastic component contained in the steering reaction force when the target rotation angle reaches the angular threshold value.

* * * * *